United States Patent [19]
Tremaine

[11] Patent Number: 6,067,204
[45] Date of Patent: May 23, 2000

[54] DISC DRIVE SERVO PATTERN INSENSITIVE TO READ HEAD

[75] Inventor: Brian P. Tremaine, San Jose, Calif.

[73] Assignee: Seagate Technology, Inc., Scotts Valley, Calif.

[21] Appl. No.: 08/867,347

[22] Filed: Jun. 2, 1997

Related U.S. Application Data

[60] Provisional application No. 60/019,122, Jun. 3, 1996.

[51] Int. Cl.[7] ................................................. G11B 5/596
[52] U.S. Cl. ..................................... 360/77.02; 360/77.07
[58] Field of Search ................................. 360/75, 77.01, 360/77.02, 77.05, 77.07, 77.08, 77.11, 78.01, 78.04, 78.14

[56] References Cited

U.S. PATENT DOCUMENTS

| | | | |
|---|---|---|---|
| 4,412,165 | 10/1983 | Case et al. | 360/77.04 |
| 4,551,776 | 11/1985 | Roalson | 360/77.02 |
| 4,616,275 | 10/1986 | Peeters | 360/77.07 |
| 4,766,508 | 8/1988 | Mathewson | 360/77.07 |
| 4,977,471 | 12/1990 | Nigam | 360/77.08 |
| 5,164,863 | 11/1992 | Janz | 360/57 |
| 5,473,550 | 12/1995 | Cameron et al. | 36/78.09 |
| 5,500,776 | 3/1996 | Smith | 360/77.08 |
| 5,689,384 | 11/1997 | Albrecht et al. | 360/77.12 |

*Primary Examiner*—David L. Ometz
*Attorney, Agent, or Firm*—Jonathan E. Olson; Shawn B. Dempster; Edward P. Heller

[57] ABSTRACT

In a disc drive, a position error signal (PES) can be generated that is insensitive to the read element's magnetic and physical geometry and micro-track profile, and that has a spatial domain periodic frequency that corresponds to a frequency region of the micro-track profile that facilitates a high magnitude response. The servo pattern for generating this PES includes a first servo burst pair (A,B) and a second servo burst pair (C,D) of servo burst members, each pair written as normal and quadrature channels.

17 Claims, 5 Drawing Sheets

POSITION — % OF TRACK PITCH

DISC DRIVE SERVO PATTERN INSENSITIVE TO READ HEAD

RELATED APPLICATION

This application is related to co-pending Provisional patent application Ser. No. 60/019,122, entitled: "DISC DRIVE SERVO PATTERN INSENSITIVE TO READ HEAD", filed Jun. 3, 1996 by the same applicant.

TECHNICAL FIELD

The present invention relates to the servo patterns written on magnetic media used by disc drives. More particularly, the present invention relates to servo patterns for being written on magnetic media and being used by a disc drive for maintaining a read/write head assembly in a desired track position. Even more particularly, the present invention relates to servo patterns and their resulting impact on the linearity of a position error signal and sensitivity of the position error signal to the disc drive's read head's magnetic and physical geometry.

BACKGROUND ART

In a disc drive using magnetic recording, data is recorded in concentric tracks on a plurality of surfaces. The recording heads are mechanically ganged together and arranged one per surface with all heads nominally positioned over the same radial track location. The assembly of heads are positioned in unison using a voice coil motor. A servo pattern, consisting of a certain topology of magnetic transitions is recorded on the surface, or surfaces, of the magnetic media. To follow the recorded data, a pre-written servo pattern, containing the recorded data information, is either written continuously along all tracks of one surface (dedicated servo), or is written in small segments of each track on all surfaces (sectored). In either case, the servo information is read back and demodulated to obtain (1) a digital track number, and (2) an analog signal indicating positions from track center. The analog signal indicating position from track center is referred to as the position error signal, referred to also herein as the PES signal. The PES signal may be digitized and manipulated as a discrete number in the disc drive's hardware or software. It is important, especially with multi-gap heads, that the PES signal be substantially linear versus true radial position of the head. With thin-film (TF), single gap read/write heads, it has been customary in practice to only position at the coincident read/write track center, or within ±10% of such to recover data. In this case it is important that the small signal gain (PES/True Position) be calibrated to a reference value. For Magneto-Resistive (MR) heads there are two gaps, the MR read element and the TF write element. Because the two gaps are offset, and a rotary actuator will introduce head skew, there can be a considerable displacement between read and write locations. This displacement can be as much as ±½ track depending on track location and head skew. For this reason, the multi-gap, MR head drive must be able to reliably position over ±½ track from any track center. In this case it is important that the small signal gain (PES/True Position) be substantially a constant reference value over the ±½ track displacement. This is another way of stating that PES must be substantially linear versus True Position. See generally, the teachings of U.S. Pat. Nos. 5,473,550 and 5,500,776.

The linearity of the PES signal using prior art patterns and methods is a strong function of the reader micro-track profile, write head geometry and write pattern. Known prior art methods of manipulating PES, such that final PES value is linear versus true position, includes the method of using inverse mapping to linearize the PES signal. The inverse mapping method is also sensitive to the head's magnetic and physical geometry.

It has also been customary practice to use a servo pattern with two channels, normal and quadrature to achieve linearity over 100% of the track pitch. Such servo pattern may consist of the track centers for the normal and quadrature channels each being spaced L tracks apart, and the displacement between normal and quadrature channels being L/2 tracks. The normal and quadrature signals are periodic with length 2L tracks. When the normal channel is zero, the quadrature channel is at an extremma, and vice versa. It is desirable that the point at which quadrature and normal signals are of the same magnitude be equidistant between adjacent normal and quadrature zero points. This point is referred to as the PES commutation point. It is a weakness with prior art servo patterns (especially with MR heads) that the commutation points are asymmetric about the normal and quadrature zero points. This problem can give rise to a discontinuity in the servo position signal at the commutation point, and a resulting servo instability in positioning.

To applicant's knowledge there are no known disc drive apparatus, servo patterns, nor servo pattern generation methods that teach generating a substantially linear position error signal with no commutation asymmetry, nor that teach generating a PES signal that is insensitive to the read head's magnetic and physical geometry's, including the reader micro-track profile.

Thus, a need is seen to exist for a disc drive apparatus, a servo pattern, and a servo pattern generation method for generating a substantially linear position error signal with no commutation asymmetry, and that generates a PES signal which is insensitive to the read head's magnetic and physical geometry's, including the reader micro-track profile.

It is therefore a primary object of the present invention to provide a disc drive apparatus, a servo pattern, and of a triangular wave pattern facilitated by a five (5) discrete level composite W(x), N-Q, according to the principles of the present invention.

DISCLOSURE OF INVENTION

Accordingly, the foregoing primary object is accomplished by providing a servo pattern having split servo bursts, servo bursts that are displaced in time, and characterized as a signal response due to an arbitrary write field and which can be written as a convolution integral, $$y(x) = \int W(x-\lambda) R(\lambda) d\lambda.$$

This convolution integral is equivalent to a low-pass filter F in the spatial domain, x, whose impulse response is R(x), and whose input signal is W(x), as shown in FIG. 1. For purposes of the present invention, the impulse response, R(x), in the convolution integral relates to the read element's micro-track profile, which is the read signal magnitude versus radial displacement in response to a track of very narrow width, dx, and an input signal, W(x), which relates to the magnitude of the write field on the disc in the x direction. The filter response is low-pass, thus the present invention teaches a W(x) whose spectral response is lower frequency than R(x). Accordingly, the filter output, y(x), is a reproduction of W(x), not corrupted by R(x). Thus, in accordance with the primary object of the present invention, filter output y(x) is insensitive to tolerance variations in R(x), which as stated above, is the read element's micro-track profile, which is the read signal magnitude versus radial displacement in response to a track of very narrow width, dx. FIGS. 2A and 2B show a simulated micro-track profile and the accompanying spectral magnitude in the spatial frequency domain, respectively. In accordance with the present invention, W(x) represents the composite of reading a plurality of servo bursts. The ideal W(x) is a triangle wave (and hence a triangular y(x)). Using the spectral frequency argument, W(x) is of lower frequency (cycles/track) than R(x), the period (tracks/cycle) of the triangular wave W(x) is long, by example two tracks per cycle. The number of steps per track, also referred to as states, required to write the pattern is preferably large to approximate a continuous triangular waveform, by example a triangular waveform having four (4) steps per track has been found to produce satisfactory results. By using saturated recording, W(x) is constrained to take on certain discrete magnitude values. The pattern and method are particularly useful in applications of disc drives apparatus utilizing magneto-resistive heads which traditionally have had a serious problem in maintaining servo linearity. Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Present Invention. In the drawings.

Figure 1:
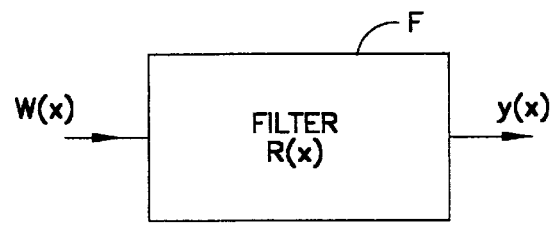
FIG. 1 is a block diagram of a filter equivalent to the read signal magnitude versus radial displacement of the micro-track profile of a read element in a magnetic disc drive, according to the principles of the present invention.

Reference numbers refer to the same or equivalent parts of the present invention throughout the several figures of the drawing.

BEST MODE OF CARRYING OUT THE INVENTION

The present invention teaches a method of creating a servo pattern for use in positioning a read/write head element on track centers of the magnetic disc media used on a disc drive apparatus. The servo pattern is created by a synthesis approach initiated by forming a desired position error signal using knowledge that a signal response y(x) due to an arbitrary write field can be written as a convolution integral, $$y(x) = \int W(x-\lambda) R(\lambda) d\lambda.$$

Figure 3:
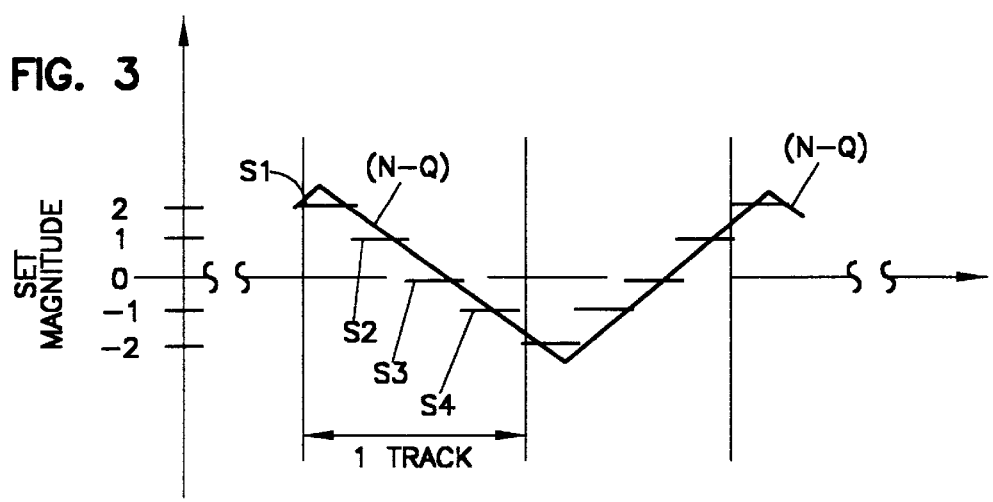
FIG. 3 is a diagram of a triangular wave pattern facilitated by a five (5) discrete magntude level composite W(x) according to the principles of the present invention.

For purposes of the present invention, the function W(x) shown in FIG. 1 represents the composite of reading all appropriate servo bursts written on a magnetic media. As stated previously, the ideal W(x) is a triangle waveform (and hence a triangular y(x)). The number of steps per track should be large to approximate a continuous triangle waveform. Accordingly, the method comprises defining a plurality of servo bursts, by example bursts A, B, C, and D, having a magnitude normalized to a member of the two (2) magnitude level set (0,1). Next, define a normal signal, N, defined to be equal to the difference between A and B, i.e (A-B), and also a quadrature signal, Q, defined to be equal to the difference between C and D, i.e. (C-D). N and Q comprise the three (3) magnitude level set namely (-1, 0, 1). To further obtain a triangular shape, define a first pattern formed by the sum of N and Q, i.e. (N+Q) and a second pattern formed by the difference between N and Q, i.e. (N-Q). These first and second patterns comprise a five (5) level magnitude set, namely (-2, -1, 0, 1, 2) and help shape the desired triangular waveform. It should be appreciated that because the patterns are periodic, which pattern is created first is not material. Further, by defining a period for the triangular waveform to be at least two track widths, the number of steps per track utilized will be maximize. FIG. 3 shows an arrangement of magnitude levels shown as steps, or states S1, S2, S3, and S4 over a spatial distance of one track with magnitudes 2, 1, 0, -1 and delineating the desired triangular waveform (N-Q) sequentially as -2, -1, 0, 1, 2 to complete the cycle over two track widths. The discrete W(x) to generate (N+Q) is by definition the quadrature of W(x) needed to form (N-Q). The servo burst pattern which gives rise to the five level (N+Q) and (N-Q) signals is synthesized from Table 1.

TABLE 1

| Five Level Pattern | | | | | | | |
|---|---|---|---|---|---|---|---|
| N − Q | N + Q | N (A − B) | Q (C − D) | A | B | C | D |
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 |

Figure 4:
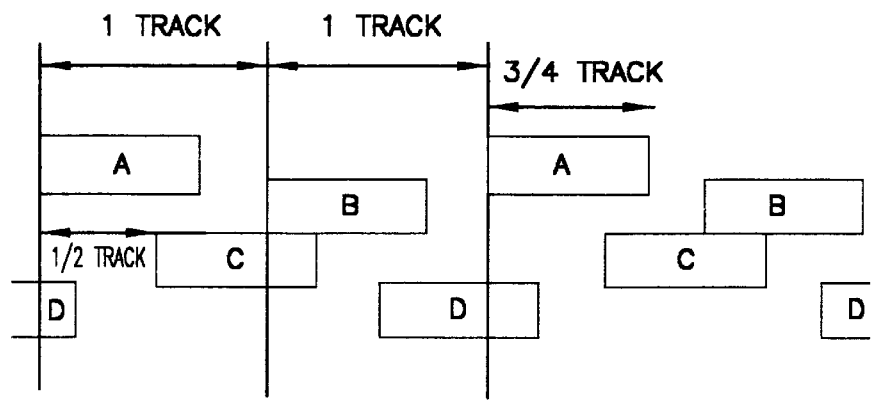
FIG. 4 is a diagram of a ¾ N-Q servo pattern according to the present invention.

The magnitude values for N, Q, A, B, C, and D are determined from the defining equations. A servo burst pattern candidate for producing a W(x) to generate (N+Q) and (N-Q) is shown in FIG. 4. As shown in FIG. 4, each servo burst (A,B,C,D) is ¾ track long with no stitching (coherent overwriting), and the pattern is written four steps per track. Commercially available head design specifications for minimum write width adequately support a servo burst pattern configured as a ¾ track burst. This pattern is referred to as the "¾ N+Q" pattern. When W(x) is filtered by R(x), the discrete approximation to a continuous W(x) will result in y(x) being substantially a triangle waveform. The fundamental frequency is 0.5 cycle per track, and the step rate is 4 steps per track. The spectral plot of the micro-track profile shown in FIG. 2B shows that a W(x) with a fundamental frequency of 0.5 cycle per track will be passed with a magnitude of near unity, while the step rate of 4 steps per track will be attenuated to about 0.15. The sequence of writing the servo burst pattern is listed below:

1. Write A, DC Erase B & C
2. Step ¼ track, DC trim D
3. Step ⅛ track, Write Greycode N
4. Step ⅛ track, Write C, DC Erase B & D
5. Step ¼ track, DC trim A
6. Step ⅛ track, Write Greycode N
7. Step ⅛ track, Write B, DC Erase A & D
8. Step ¼ track, DC trim C
9. Step ⅛ track, Write Greycode N+1
10. Step ⅛ track, Write D, DC Erase A & C
11. Step ¼ track, DC trim B
12. Step ⅛ track, Write Greycode N+1
13. Step ⅛ track, go to #1

The resulting N signal has nulls on every data track, and the resulting Q signal nulls on every half track, allowing one Grey code for every data track. Commutation occurs every ±¼ track. In order to compare the "¾ N+Q" servo pattern to the prior art patterns, the pattern of the present invention is processed using (N+Q) and (N-Q) in a seamless algorithm without linearization. The "¾ N+Q" pattern is practical in that there are only four bursts (A,B,C,D) and it is written with four steps per track, (6 steps including Greycode). Both these criteria are to be minimized for efficiency in disk space and writing time. An extension to the above is to use six bursts (A,B,C,D,E,F). If R=(E-F), then define (N+Q+R) and (N+Q-R) will have an amplitude set (-3,-2,-1,0,1,2,3), or 7 levels. Thus, a triangle wave with period 0.5 cy/track and 6 steps per track can be synthesized. In a similar fashion, additional servo burst pairs can be added to approximate the continuous triangle wave to any desired level of steps per track at the expense of servo trackwriter process time and servo pattern space efficiency.

Figure 5:
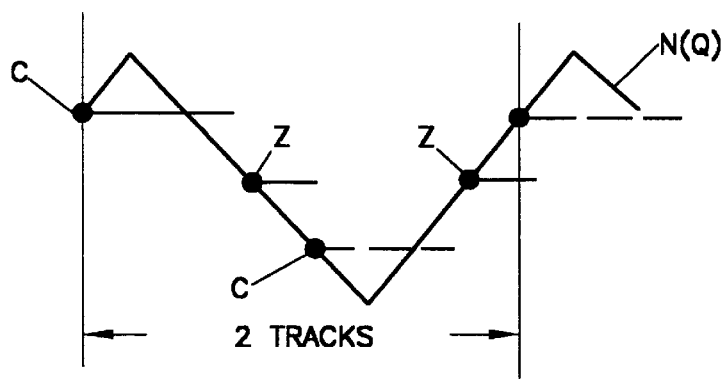
FIG. 5 is a diagram of a triangular wave pattern facilitated by a three (3) discrete magnitude level composite W(x) according to the principles of present invention.

A variant on the above method is a pattern designed using only N and Q, not their sum and difference. As explained above, this is a three level pattern (-1 0 1). However, a three level sample of the ideal continuous W(x) does not give adequate resolution for good linearity. In this case, the samples are taken unevenly to improve resolution between commutation points. Specifically, the three levels sampled are the two commutation points C and the servo null (zero point) Z as shown in FIG. 5. Table 2 below shows the values of N, Q, A, B, C and D for this pattern. This pattern is identical to the previous pattern in FIG. 4, and only differs in the processing on N and Q.

TABLE 2

Three Level Pattern

| N (A - B) | Q (C - D) | A | B | C | D |
|---|---|---|---|---|---|
| 1 | -1 | 1 | 0 | 0 | 1 |
| 1 | 0 | 1 | 0 | 0 | 0 |
| 1 | 1 | 1 | 0 | 1 | 0 |
| 0 | 1 | 0 | 0 | 1 | 0 |
| -1 | 1 | 0 | 1 | 1 | 0 |
| -1 | 0 | 0 | 1 | 0 | 0 |
| -1 | -1 | 0 | 1 | 0 | 1 |
| 0 | -1 | 0 | 0 | 0 | 1 |

As stated previously, it is a weakness with prior art servo patterns (especially with MR heads) that the commutation points are asymmetric about the normal and quadrature zero points. The prior art servo patterns exhibit commutation points that satisfy the set equation $\{x:|N|=|Q|\}$, which are not symmetric about the null points. The micro-track profile, R(x), can be decomposed into even and odd components, $$R^+(x)=(R(x)+R(-x))/2$$
$$R^-(x)=(R(x)-R(-x))/2$$

Figure 2A:
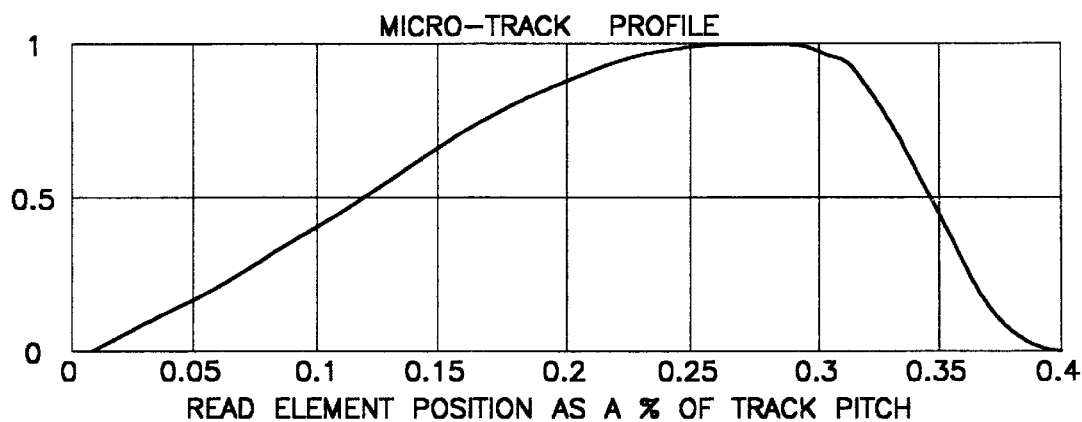
FIG. 2A is the micro-track profile for the read element of FIG. 1.
Figure 2B:
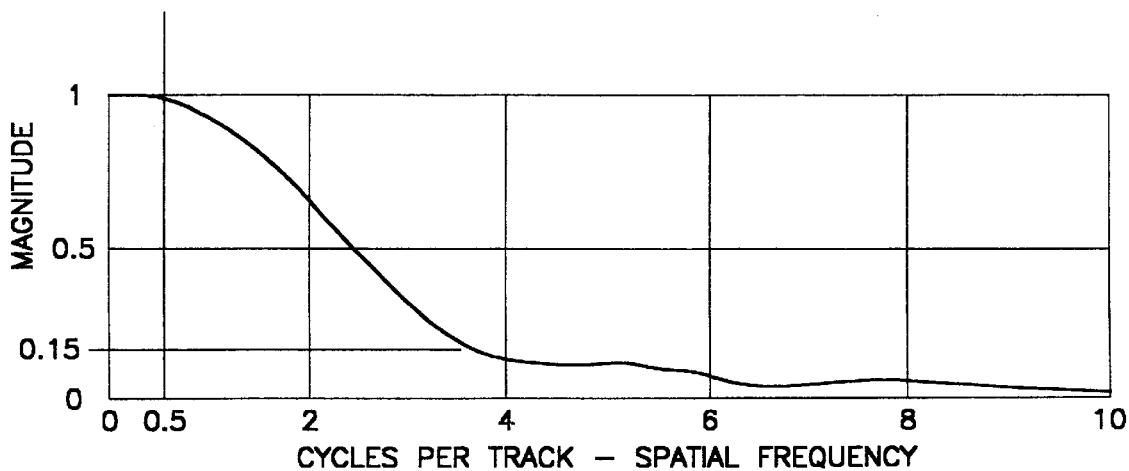
FIG. 2B is the micro-track spectral magnitude for the read element of FIG. 1.
Figure 6:
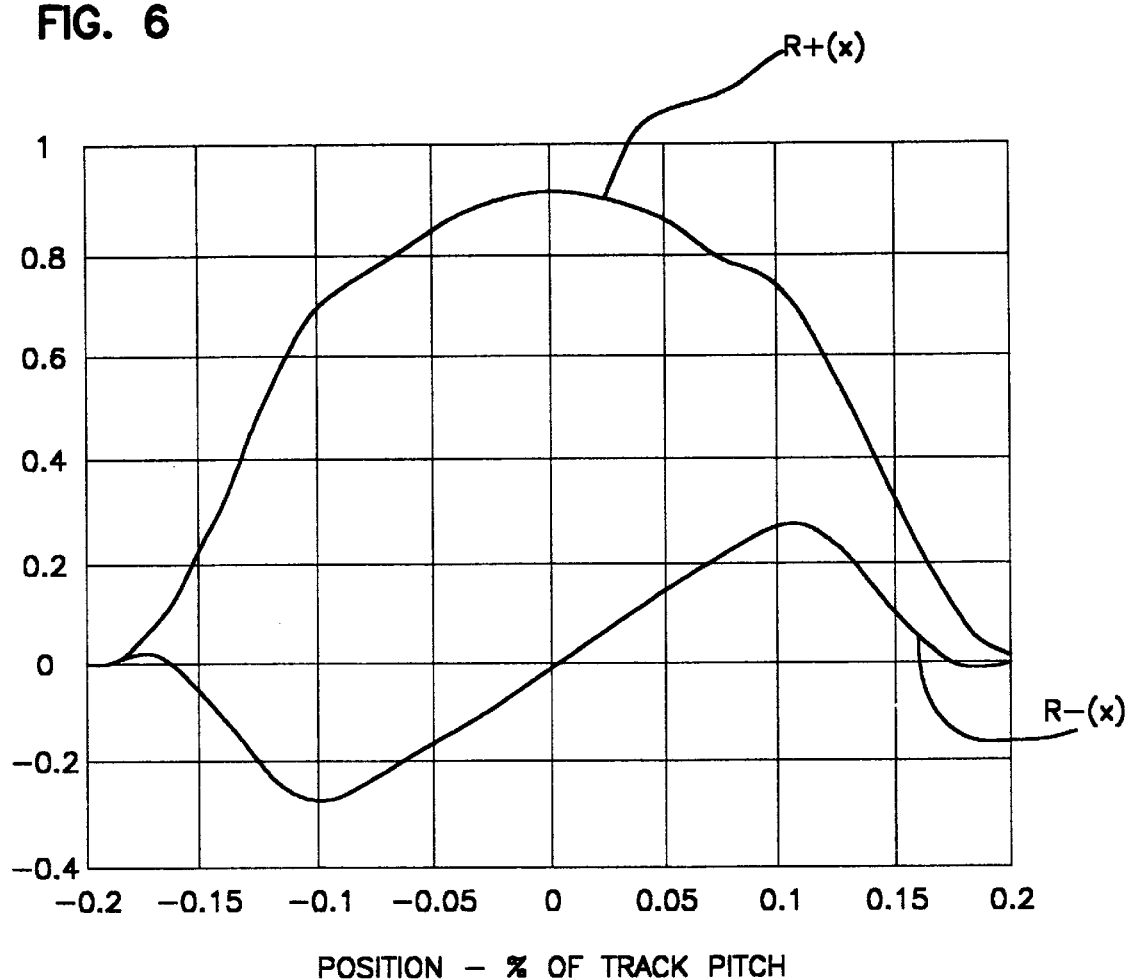
FIG. 6 is a micro-track profile for the even and odd components for R(x) of FIG. 2A.
Figure 7:
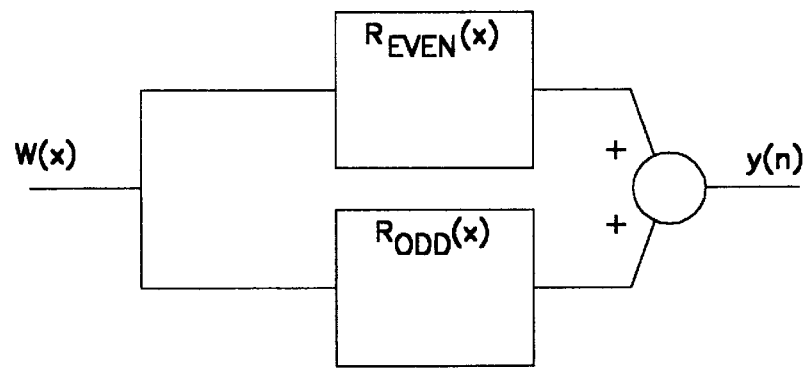
FIG. 7 is the filter of FIG. 1 decomposed into odd and even functions.

These are plotted in FIG. 6 for the R(x) of FIG. 2A. FIG. 7 shows an equivalent filter of R(x). The response of the equivalent filter, R(x), can be thought of as the summation of the even component and odd component. The spatial frequency symmetric (odd) component is a bandpass function higher than the low frequency symmetric (even) component. Since the design of W(x) is such that the effect of R(x) is minimized, the servo pattern design produced in accordance with the present invention minimizes the asymmetry of the commutation points.

Figure 8:
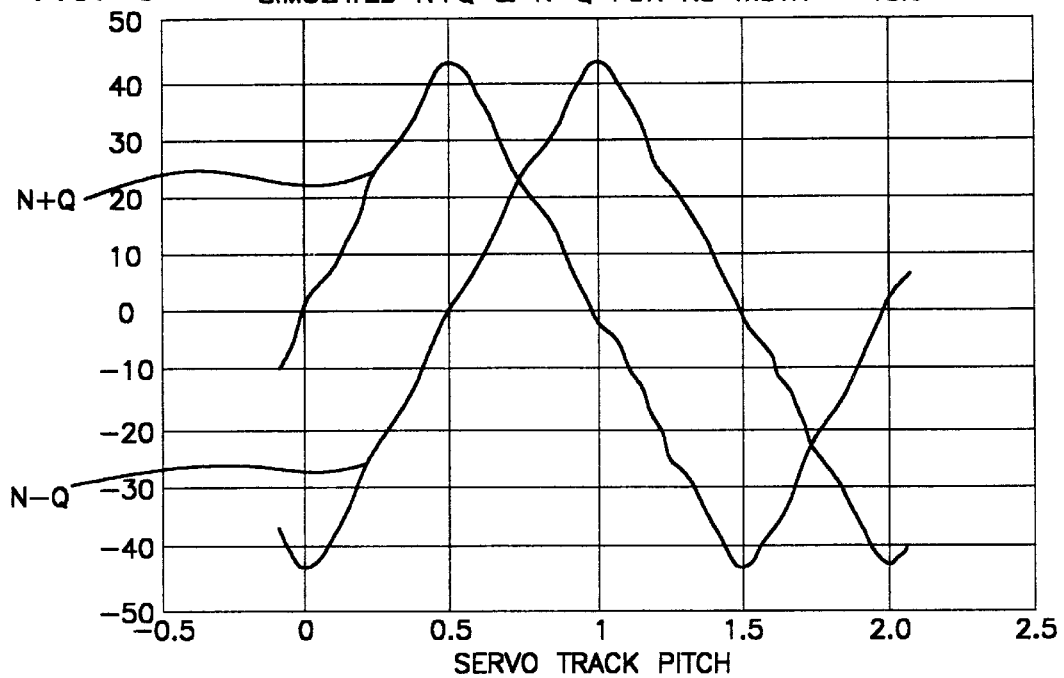
FIG. 8 is a PES simulation of a ¾ N+Q pattern in accordance with the present invention using the micro-track profile shown in FIG. 2A.
Figure 9:
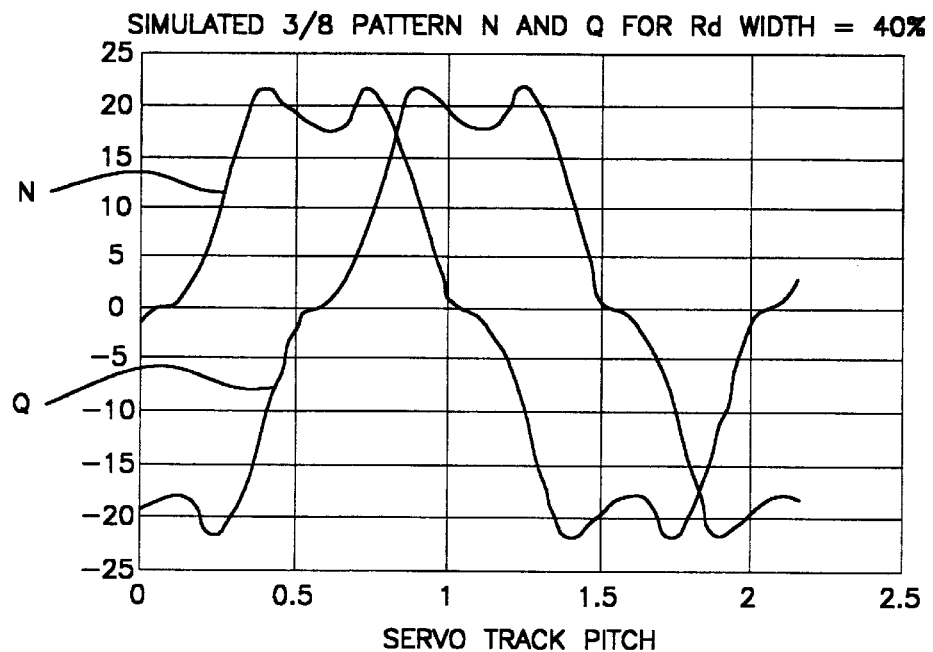
FIG. 9 is a prior art PES simulation of a ⅜ N and Q pattern, using the micro-track profile shown in FIG. 2A, and which simulation is used for comparing PES linearity against the PES linearity of the ¾ N+Q pattern shone in FIG. 8.
Figure 10:
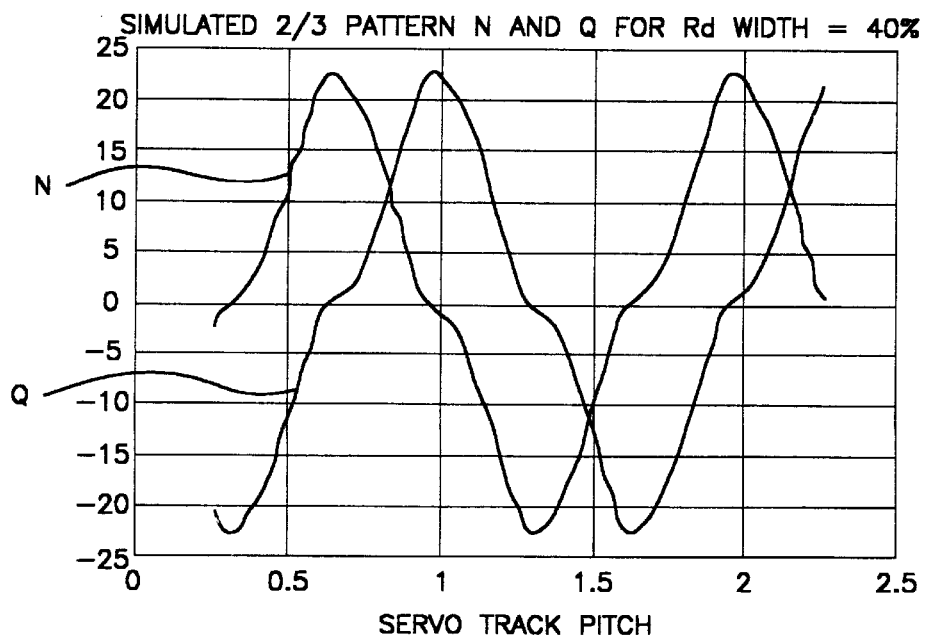
FIG. 10 is a prior art PES simulation of a ⅔ N and Q pattern, using the micro-track profile shown in FIG. 2A, and which simulation is used for comparing PES linearity against the PES linearity of the ¾ N+Q pattern shone in FIG. 8.

FIGS. 8–10 show simulated '¾ N+Q'/N-Q pattern, ⅜ N/Q pattern and '⅔ N/Q' pattern using the micro-track profile of FIG. 2A. The ⅜ N/Q pattern is a servo burst pattern where the (A,B), (C,D) bursts are 1 and ⅜ tracks in length and overlap each other by ⅜ of a track. The ⅔ N/Q pattern is commonly referred to as a checkerboard (A,B,C, D) servo burst pattern written such that the bursts are ⅔ of a track in length. The three patterns were simulated for asymmetric micro-track profiles of width 40% of track pitch. The resultant N and Q signals were used to calculate the linearity coefficients and commutation asymmetry. The processing of N and Q assumed a seamless algorithm. Table 3 shows the results of the three different servo patterns with a narrow and wide reader after applying a normalization and a 2nd order polynomial linearization.

TABLE 3

Linearity Measures versus Pattern Type and Read Width

|  | 3/8 | | 2/3 | | 3/4 N + Q | |
|---|---|---|---|---|---|---|
| Rd Width | 40% | 70% | 40% | 70% | 40% | 70% |
| slope ratio | 3.596 | 1.289 | 2.258 | 1.235 | 1.639 | 1.196 |
| c0 | 21.940 | 9.256 | 27.932 | 11.329 | 16.359 | 14.967 |
| c1 | -347 | 445 | -722 | 316 | 1.55 | 88.5 |
| max error | 9.9 | 4.1 | 14.9 | 4.6 | 4.9 | 1.1 |
| com. pnts. | -22.3/ 27.7 | -23.5/ 26.5 | -23.3/ 26.7 | -20.6/ 29.4 | -25.0/25.0 | -25.0/25.0 |

The '⅔' and '⅜' patterns use the following normalization:

$$N1=N/[|N|+|Q|] \text{ and } Q1=Q/[|N|+|Q|]$$

This normalization has been earlier disclosed and is referred to as a seamless commutation. While the '¾N+Q'/N-Q patterns use the following normalization:

$N1=(N+Q)/[|N+Q|+|N-Q|]$, $Q1=(N-Q)/[|N+Q|+|N-Q|]$.

The resulting (N1,Q1) are linearized by fitting N1 versus true position using a 2nd order polynomial: $Xtrue=c0\ N1+c1\ (N1)^2$. The two extremes of reader width using the '⅔' pattern and '⅜' pattern both have a large variation in slope ratio. This is the (maximum slope)/(minimum slope) over the range from -commutation to +commutation. This can also be seen in coefficient c0, the linear gain term, which varies 2.37:1 over reader width for '⅔' and 2.46:1 for '⅜' patterns. However, the '3/4 N+Q' slope ratio change is relatively small, 1.639 maximum. The coefficient c0 for '¾N+Q' varies only 1.093:1 over reader width. The commutation point for '¾N+Q' is ideal, while the others show significant asymmetry. The small size of the c1 coefficient for '¾ N+Q' shows that the quadratic term is very small compared to the linear term. This is also evident in the fact that the max error is smaller for the '¾ N+Q' pattern ('max error' is the deviation of true position from linearized N1 scaled to 1 track=256 counts). The very good linearity of the '¾N+Q' pattern suggests that linearization may be unnecessary and a default gain value (c0) only is satisfactory. Another possibility would be for the drive code to calibrate the gain to arrive at unique c0 for each head.

Figure 11:
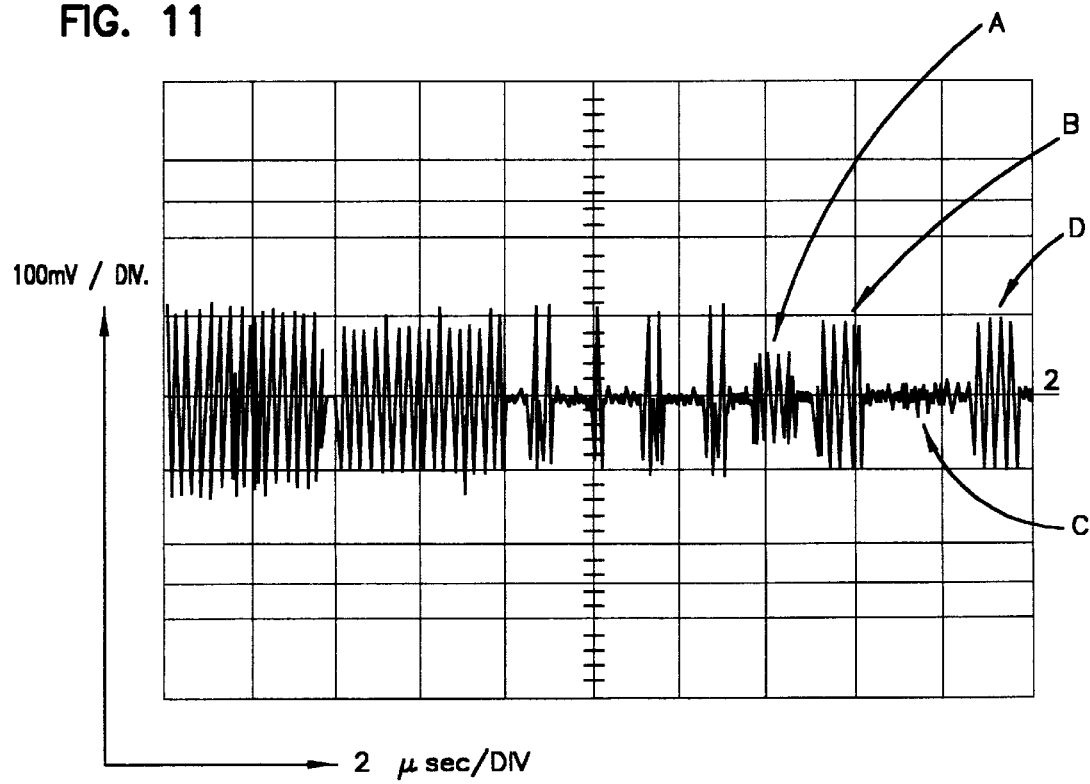
FIG. 11 is the time differentiated output signal of analog servo for the ¾ N+Q pattern according to the principles of the present invention.

FIG. 11 shows an oscilloscope measurement of an analog readback of the servo signal as written in accordance with the sequence previously discussed, and as measured at the differentiated read channel output of a disc drive apparatus (2.0 usec/div). It is given for timing reference of the servo pattern. The A/B/C/D bursts are each written as 8 transitions of 4.0 Mc (analog). The spacing in the offtrack direction is given by FIG. 4, and the pattern writing sequence disclosed above.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. A method for generating a position error signal in a disc drive, said method comprising the steps of:
   (a) determining a micro-track profile for a read element of said disc drive, said micro-track profile including a spectral magnitude profile in a spatial frequency domain wherein a high magnitude response occurs at a low-end spatial frequency and a low magnitude response occurs at a high-end spatial frequency;
   (b) characterizing said micro-track profile as a low-pass filter in a spatial domain;
   (c) facilitating generation of a position error signal that is insensitive to the read element's magnetic and physical geometry's, including said reader micro-track profile by designing a servo burst pattern such that a spectral response is at a lower spatial frequency than said low end spatial frequency;
   (d) writing said designed servo burst pattern onto the magnetic media of said disc drive; and
   (e) reading said servo burst pattern and generating said position error signal.

2. A method for generating a position error signal in a disc drive as described in claim 1, wherein:
   said characterizing step comprises characterizing said position error signal as a signal response of the filter in a spatial frequency domain due to a write field and which can be written as a spatial domain convolution integral:

$$y(x)=\int W(x-\lambda)R(\lambda)d\lambda,$$

where R(x) is an impulse response that relates to said read element's micro-track profile, which is a read signal magnitude versus radial displacement in response to a track of very narrow width, dx, and W(x) relates to the magnitude of a field of said written servo burst pattern on a magnetic disc in an x direction.

3. A method for generating a position error signal in a disc drive as described in claim 2, wherein:
   said designing step comprises creating a triangular waveform in the spatial domain whose periodic frequency is at least two 0.5 cycles per track and whose triangular shape is delineated by at least one state equation producing at least four (4) steps (states) per track and having at least five (5) discrete magnitude levels in a period.

4. A method for generating a position error signal in a disc drive as described in claim 3, wherein:
   said designing step comprises creating the at least one state equation that comprise mathematical manipulation of normal and quadrature channels having individual servo burst patterns active for ¾ of a track pitch, and further creating a magnitude matrix comprising:

| N − Q | N + Q | N (A − B) | Q (C − D) | A | B | C | D |
| --- | --- | --- | --- | --- | --- | --- | --- |
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 | where A,B,C,D are individual servo bursts, and N and Q are normal and quadrature magnitude responses.

5. A method for generating a position error signal in a disc drive as described in claim 1, wherein:
   said designing step comprises creating a triangular waveform in the spatial domain whose periodic frequency is at least two 0.5 cycles per track and whose triangular shape is delineated by at least one state equation producing at least four (4) steps (states) per track and having at least five (5) discrete magnitude levels in a period.

6. A method for generating a position error signal in a disc drive as described in claim 5 wherein:
   said designing step comprises creating the at least one state equation that comprise mathematical manipulation of normal and quadrature channels having individual servo burst patterns active for ¾ of a track pitch, and further creating a magnitude matrix comprising:

| N − Q | N + Q | N (A − B) | Q (C − D) | A | B | C | D |
| --- | --- | --- | --- | --- | --- | --- | --- |
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |

-continued

| N − Q | N + Q | N (A − B) | Q (C − D) | A | B | C | D |
|---|---|---|---|---|---|---|---|
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 | where A,B,C,D are individual servo bursts, and N and Q are normal and quadrature magnitude responses.

7. A method for generating a position error signal in a disc drive, said method comprising the steps of:

(a) determining a micro-track profile for a read element of said disc drive, said micro-track profile including a spectral magnitude profile in a spatial frequency domain wherein a high magnitude response occurs at a low-end spatial frequency and a low magnitude response occurs at a high-end spatial frequency;

(b) establishing a finite number of servo burst pairs for determining a servo burst pattern;

(c) assigning a first discrete value to a written state of each servo burst pair;

(d) assigning a second discrete value to a non-written state of each servo burst pair;

(e) defining a first generation state equation for each of said servo burst pairs, said first generation state equation comprising three discrete magnitude levels;

(f) establishing a subsequent generation state equation relating to at least one pair of said first generation state equations, said subsequent generation state equation comprising at least five discrete magnitude levels;

(g) defining a desired number of points per-track for delineating a triangular waveform in the spatial domain, said triangular waveform being a plot of said subsequent generation state equation, said number of points per-track relating to a track on a magnetic media disc, each of the points representing a change in state in said subsequent generation state equation, and said number of points per-track representing a spatial frequency that is greater than said high-end spatial frequency;

(h) defining a period of said triangular waveform as being a spatial distance equal to at least two track widths on said magnetic media disc, said period being related to a very low spatial frequency, lower than said low-end spatial frequency;

(i) defining a matrix comprising a sequential arrangement of said at least five discrete magnitude levels, said defined matrix of discrete magnitude levels collectively delineating said triangular waveform over said period;

(j) synthesizing individual servo burst pairs and respective discrete values by mathematically manipulating said sequential arrangement of five magnitude levels in said subsequent generation state equation and results therefrom in said first generation state equation and producing a composite servo burst pattern;

(k) recording said composite servo burst pattern for facilitating generation of a position error signal that is insensitive to the read element's magnetic and physical geometry's; and (l) reading said composite servo burst pattern and generating said position error signal.

8. A method for generating a position error signal in a disc drive as described in claim 7, wherein:

said step of defining a first generation state equation comprises defining a normal state equation N for a first pair of servo bursts termed A and B as being N=A−B and a quadrature state equation Q for a second pair of servo bursts termed C and D as being Q=C−D, said servo bursts A,B,C,D having said first and second discrete values being 0 and 1 respectively, and said three discrete magnitude levels being −1, 0, and 1, said subsequent generation state equation comprises N−Q and N+Q, and said five discrete levels comprise (−2,−1,0,1,2), said number of points per track being 4 steps per track, said period comprises 0.5 cycle per track, and said matrix comprises

| N − Q | N + Q | N (A − B) | Q (C − D) | A | B | C | D |
|---|---|---|---|---|---|---|---|
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 | where said matrix is utilized for effecting said synthesizing step.

9. A servo pattern for use in generating a position error signal, said servo pattern comprising:

a plurality of servo burst pairs each comprising two servo burst members, said plurality of servo burst pairs comprising at least a first servo burst pair (A,B) and a second servo burst pair (C,D), said plurality of servo burst pairs being written on magnetic media as normal and quadrature channels, said servo burst pairs being arranged such that upon being read by a read element of a disc drive, said servo pattern produces a position error signal with no commutation asymmetry, and which is insensitive to said read element's magnetic and physical geometry and micro-track profile, said produced position error signal having a spatial domain periodic frequency that corresponds to a spatial frequency region of said micro-track profile that facilitates a high magnitude response.

10. A servo pattern for use in generating a position error signal as described in claim 9, wherein:

said servo burst pairs being arranged by writing a thirteen step sequence comprising:

1. Write A, DC Erase B & C,
2. Step ¼ track, DC trim D,
3. Step ⅛ track, Write Greycode N,
4. Step ⅛ track, Write C, DC Erase B & D,
5. Step ¼ track, DC trim A,
6. Step ⅛ track, Write Greycode N,
7. Step ⅛ track, Write B, DC Erase A & D,
8. Step ¼ track, DC trim C,
9. Step ⅛ track, Write Greycode N+1,
10. Step ⅛ track, Write D, DC Erase A & C,
11. Step ¼ track, DC trim B,
12. Step ⅛ track, Write Greycode N+1, and
13. Step ⅛ track, go to #1.

11. A servo pattern for use in generating a position error signal as described in claim 9, wherein:

each servo burst member being written in an active state for ¾ of a track pitch length; and each servo burst member having a discrete magnitude value, which, upon being read and manipulated as normal and quadrature servo burst signals, termed N and Q signals, said position error signal is produced, said position error signal being characterized as a magnitude matrix comprising:

| N − Q | N + Q | N (A − B) | Q (C − D) | A | B | C | D |
|---|---|---|---|---|---|---|---|
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 | wherein said N+Q and said N−Q set of magnitudes values delineate triangular waveforms having said spatial domain periodic frequency.

12. A servo pattern for use in generating a position error signal as described in claim 11, wherein:

said servo burst pairs being arranged by writing a thirteen step sequence comprising:
1. Write A, DC Erase B & C,
2. Step ¼ track, DC trim D,
3. Step ⅛ track, Write Greycode N,
4. Step ⅛ track, Write C, DC Erase B & D,
5. Step ¼ track, DC trim A,
6. Step ⅛ track, Write Greycode N,
7. Step ⅛ track, Write B, DC Erase A & D,
8. Step ¼ track, DC trim C,
9. Step ⅛ track, Write Greycode N+1,
10. Step ⅛ track, Write D, DC Erase A & C,
11. Step ¼ track, DC trim B,
12. Step ⅛ track, Write Greycode N+1, and
13. Step ⅛ track, go to #1.

13. A disc drive apparatus, said apparatus comprising:
a plurality of data reader elements, each data reader element having a corresponding micro track profile for indicating a degree of spatial positioning sensitivity due to its respective magnetic and physical properties;
a plurality of electronic and mechanical positioning components including supporting electronic componentry for generating positioning signals;
a plurality of magnetic disc media for recording data, each of said magnetic disc media having a plurality of concentric tracks for delineating space for recording data, said data reader elements being responsive to a positioning error signal produced by said electronic componentry for positioning said data reader elements over each respective track center to accurately read recorded data; and
a servo burst pattern recorded on each of said magnetic disc media for use in generating said position error signal, said servo burst pattern comprising a plurality of servo burst pairs each comprising two servo burst members, said plurality of servo burst pairs comprising at least a first servo burst pair (A,B) and a second servo burst pair (C,D), said servo burst pairs being arranged such that upon being read by said data reader element said position error signal is generated, said position error signal being characterized by having a spatial frequency response in a spatial frequency region of said micro-track profile that facilitates a high magnitude response and being insensitive to said data reader element's magnetic and physical geometry and corresponding micro-track profile and such that it has no commutation asymmetry.

14. A disc drive apparatus as described in claim 13, wherein:

each servo burst member being written in an active state for ¾ a track pitch length; and each servo burst member having a discrete magnitude value, which, upon being read and manipulated as normal and quadrature servo burst signals, termed N and Q signals, said position error signal is produced, said position error signal being characterized as a magnitude matrix comprising:

| N − Q | N + Q | N (A − B) | Q (C − D) | A | B | C | D |
|---|---|---|---|---|---|---|---|
| 2 | 0 | 1 | −1 | 1 | 0 | 0 | 1 |
| 1 | 1 | 1 | 0 | 1 | 0 | 0 | 0 |
| 0 | 2 | 1 | 1 | 1 | 0 | 1 | 0 |
| −1 | 1 | 0 | 1 | 0 | 0 | 1 | 0 |
| −2 | 0 | −1 | 1 | 0 | 1 | 1 | 0 |
| −1 | −1 | −1 | 0 | 0 | 1 | 0 | 0 |
| 0 | −2 | −1 | −1 | 0 | 1 | 0 | 1 |
| 1 | −1 | 0 | −1 | 0 | 0 | 0 | 1 | wherein said N+Q and said N−Q set of magnitudes values delineate triangular waveforms having a spatial domain periodic frequency in said spatial frequency region.

15. A disc drive apparatus as described in claim 14, wherein:

said servo burst pairs are arranged by a thirteen step sequence comprising:
1. Write A, DC Erase B & C,
2. Step ¼ track, DC trim D,
3. Step ⅛ track, Write Greycode N,
4. Step ⅛ track, Write C, DC Erase B & D,
5. Step ¼ track, DC trim A,
6. Step ⅛ track, Write Greycode N,
7. Step ⅛ track, Write B, DC Erase A & D,
8. Step ¼ track, DC trim C,
9. Step ⅛ track, Write Greycode N+1,
10. Step ⅛ track, Write D, DC Erase A & C,
11. Step ¼ track, DC trim B,
12. Step ⅛ track, Write Greycode N+1, and
13. Step ⅛ track, go to #1.

16. A disc drive apparatus as described in claim 13, wherein:

said plurality of data reader elements comprise magneto-resistive (MR) read/write heads.

17. A disc drive apparatus as described in claim 13, wherein:

said plurality of data reader elements comprise thin-film (TF) read/write heads.

* * * * *